(12) United States Patent
Delanghe et al.

(10) Patent No.: US 7,405,769 B2
(45) Date of Patent: Jul. 29, 2008

(54) METHOD AND SYSTEM FOR 3D COMB SYNCHRONIZATION AND ALIGNMENT OF STANDARD AND NON-STANDARD VIDEO SIGNALS

(75) Inventors: Brad Delanghe, Sunnyvale, CA (US); Aleksandr Movshovich, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 818 days.

(21) Appl. No.: 10/875,436

(22) Filed: Jun. 24, 2004

(65) Prior Publication Data

US 2005/0174485 A1 Aug. 11, 2005

Related U.S. Application Data

(60) Provisional application No. 60/542,945, filed on Feb. 9, 2004.

(51) Int. Cl.
*H04N 9/475* (2006.01)
*H04N 7/00* (2006.01)
*H04L 7/00* (2006.01)

(52) U.S. Cl. .................. 348/514; 348/497; 348/549

(58) Field of Classification Search ............... 348/497, 348/500, 513, 516, 514, 501, 536, 547, 549, 348/663; 345/213
See application file for complete search history.

(56) References Cited

U.S. PATENT DOCUMENTS

| | | | | |
|---|---|---|---|---|
| 3,637,936 A * | 1/1972 | Krause | ................... | 386/18 |
| 4,633,298 A * | 12/1986 | Steckler et al. | ............. | 348/539 |
| 4,672,447 A * | 6/1987 | Moring et al. | ............. | 348/537 |
| 5,220,414 A * | 6/1993 | Rabii et al. | ................. | 348/665 |
| 5,430,485 A * | 7/1995 | Lankford et al. | ......... | 348/423.1 |
| 5,621,478 A * | 4/1997 | Demmer | ..................... | 348/639 |
| 5,692,016 A * | 11/1997 | Vanselow | ................... | 375/344 |
| 6,188,731 B1 * | 2/2001 | Kim | ....................... | 375/240.28 |
| 6,535,208 B1 * | 3/2003 | Saltchev et al. | ............. | 345/213 |
| 6,583,821 B1 * | 6/2003 | Durand | ....................... | 348/515 |
| 7,253,844 B2 * | 8/2007 | Hiltunen et al. | ............. | 348/569 |

* cited by examiner

*Primary Examiner*—Victor R Kostak
(74) *Attorney, Agent, or Firm*—McAndrews, Held & Malloy, Ltd.

(57) ABSTRACT

In a method and system for 3D comb synchronization and alignment of standard and non-standard video signals, a coarse synchronization is performed on a bottom frame, a current frame, and a top frame based on a bottom frame field count. The current frame is assigned the frame transferred immediately prior to a bottom frame whereas the top frame is assigned the frame transferred two frames. A current frame window signal and a top frame window signal may be used to lock the current frame and the top frame to a bottom frame vertical sync signal. After coarse synchronization, the video frames are finely aligned by correlating a phase difference between the subcarrier signals in each frame and modifying the phase difference until the correlation results in a specified phase locked value range. This method and system may facilitate the handling of video stream switching and non-standard data streams.

38 Claims, 6 Drawing Sheets

METHOD AND SYSTEM FOR 3D COMB SYNCHRONIZATION AND ALIGNMENT OF STANDARD AND NON-STANDARD VIDEO SIGNALS

CROSS-REFERENCE TO RELATED APPLICATIONS/INCORPORATION BY REFERENCE

This application makes reference to, claims priority to, and claims the benefit of U.S. Provisional Application Ser. No. 60/542,945, entitled "Method for 3D Comb Synchronization and Alignment of Standard and Non-Standard Video Signals," filed on Feb. 9, 2004.

This application makes reference to U.S. application Ser. No. 10/875,439 filed on Jun. 24, 2004.

The above stated applications are hereby incorporated herein by reference in their entirety.

FIELD OF THE INVENTION

Certain embodiments of the invention relate to processing of video signals. More specifically, certain embodiments of the invention relate to a method and system for 3D comb synchronization and alignment of standard and non-standard video signals.

BACKGROUND OF THE INVENTION

In video system applications, a picture is displayed on a television or computer screen by scanning an electrical signal horizontally across the screen one line at a time. The amplitude of the signal at any one point on the line represents the brightness level at that point on the screen. A video frame contains the necessary information from the lines that make up the picture and from the associated synchronization (sync) signals to allow a scanning circuit to trace the lines from left to right and from top to bottom in order to recreate the picture on the screen. This information includes the luma (Y), or brightness, and the chroma (C), or color, components of the picture. There may be two different types of picture scanning in a video system. The scanning may be interlaced or it may be non-interlaced or progressive. Interlaced scanning occurs when each frame is divided into two separate sub-pictures or fields. The interlaced picture may be produced by first scanning the horizontal lines that correspond to the first field and then retracing to the top of the screen and scanning the horizontal lines that correspond to the second field. The progressive or non-interlaced picture may be produced by scanning all of the horizontal lines of a frame in one pass from the top to the bottom of the screen.

The luma (Y) and chroma (C) signal components that represent a picture are modulated together in order to generate a composite video signal. Integrating the luma and chroma video elements into a composite video stream facilitates video signal processing since only a single composite video stream is transmitted. Once a composite signal is received, the luma and chroma signal components must be separated in order for the video signal to be processed and displayed as a picture on the screen. A comb filter may be utilized for separating the luma and chroma video signal components. For example, a television may be adapted to receive a composite video input but the chroma and luma video components have to be separated before the television can display the received video signal.

FIG. 1A is a diagram illustrating the generation of a conventional composite video signal. Referring to FIG. 1A, adding the chroma signal component 102 and the luma signal component 104 produces a composite video signal 106. The luma signal component 104 may or may not increase in amplitude in a stair step fashion. The chroma signal component 102 may comprise a color difference component U that is modulated by, for example, a sine signal with a 3.58 MHz frequency, and a color difference component V that is modulated by, for example, a cosine signal with a 3.58 MHz frequency. The modulation scheme may be selected so that it provides quadrature modulation between the U and V color difference components. An exemplary composite video signal 106 may be a composite video signal with burst and syncs (CVBS).

FIG. 1B is a diagram illustrating the position of color burst and active video in a conventional composite video signal. Referring to FIG. 1B, a portion of the composite video signal 108 may be a color burst 110 and a different portion may be the active video signal 112. The color burst 110 may comprise a brief sample of, for example, eight to ten cycles of unmodulated color subcarrier which have been inserted by an NTSC or PAL encoder onto the back porch of the composite video signal to enable a decoder to regenerate the color subcarrier from it. The active video portion 112 of the composite video signal 108 contains the luma and chroma signal components of the picture or image.

FIG. 1C is a graphical diagram illustrating the phase relationship of modulated chroma signals in contiguous composite video signal frames. The chroma signal component in the active video portion of an NTSC composite video signal may modulated at such a frequency that every line of video in a video frame is phase-shifted by 180 degrees from the previous line. Referring to FIG. 1C, the bottom frame, the current frame, and the top frame are contiguous composite video frames and the (M−1) video line, the M video line, and the (M+1) video lines are contiguous video lines within the video frame, where M corresponds to any current line which may have a previous line and a next line adjacent to it. The "bottom frame" may correspond to the frame that is currently being received while the "current frame" and the "top frame" may correspond to frames that have been delayed by one and two frames respectively. The M video line in the "current frame" is phase-shifted by 180 degrees from the (M−1) video line in the "current frame" as well as from the (M+1) video line in the "current frame." Similarly, the M video line in the "bottom frame" is phase-shifted by 180 degrees from the (M−1) video line in the "bottom frame" as well as from the (M+1) video line in the "bottom frame." In addition, since the fields are at a frequency rate of 59.94 Hz, there is a 180-degree phase shift between two adjacent frames, for example, the "current frame" and the "top frame." Correspondingly, the M video line in the "current frame" is 180 degrees phase-shifted from the M video line in the "top frame." In a PAL composite video signal, adjacent video lines and adjacent frames may have a 90-degree phase shift, requiring a two line or two frame delay in order to obtain video lines or frames with a 180-degree phase shift.

In conventional video processing, there are three ways to separate the luma and chroma video components received in a composite video signal—by utilizing a notch filter, by combing vertically or by combing temporally. During separation of the luma and chroma signal components, there are three bandwidth directions that may incur losses in the separation process and in the separated signal. Depending on the combing method that is utilized, the separated signal may have reduced vertical bandwidth, horizontal bandwidth, and/or temporal bandwidth.

The first way to separate the luma and chroma video components is by utilizing a notch filter. Since the components in a chroma signal are modulated at 3.58 MHz, a notch filter that is set at 3.58 MHz may be utilized. The notch filter, however, reduces the horizontal bandwidth in the output video signal and as a result the luma video component is increased. A comb filter delays a prior horizontally scanned line in order it compare it with a currently scanned horizontal line. Combing vertically may also be utilized to separate the luma and chroma video components. Combing vertically may be achieved in three different ways—the current line may be combed with the previous and the next line, the current line may be combed with the line just before it, or the current line may be combed with the line just after it. The vertical combing is performed spatially, i.e., only within two fields at a time and without any temporal combing. During combing in the "current frame," for example, if the current line is added to the previous line, the chroma content cancels out and two times the luma content is obtained. On the other hand, if the previous line is subtracted from the current line, the luma content cancels out and two times the chroma content is obtained. In this way, luma and chroma content may be separated from the composite video signal for further processing. In addition, the vertical combing results in a reduced vertical bandwidth.

A third way to comb a composite signal is to comb temporally. Combing temporally comprises combing between two adjacent or contiguous frames, for example, the "current frame" and the "bottom frame" or the "current frame" and the "top frame." Further, temporal combing is characterized by a reduced temporal bandwidth. The luma and chroma components may be separated by utilizing the same addition and subtraction methodology between a current line and a previous line, which is employed by vertical combing.

While 2-D comb filters may be adapted to process successive scan lines for a single field of a video frame, 3-D comb filters may be adapted to process scan lines that are taken from successive video frames. In general, for 3-D comb filtering, if there is motion between the successive video frames, a 3-D comb filter must revert to 2-D comb filtering. Motion includes color changes and image movement between frames. Accordingly, the 3-D comb filter may be required to buffer at least one frame in order to determine whether there is motion between the buffered frames. In an instance where there are color changes or image movements between the buffered frames, the corresponding Y/C components for the buffered frames will be different and the results of combing would be incorrect.

Since the 3-D comb filter may be required to buffer at least one frame of video data, several complete frames of video data must be stored in buffers as opposed to just 2 or 3 lines which are required by 2-D comb filters. Accordingly, 3-D comb filters require a large or significant amount of video memory and excessive memory processing bandwidth requirements. This large memory and excessive memory processing bandwidth requirements, along with the necessary motion detection processing, increases the cost associated with 3-D comb filter solutions.

Three-dimensional (3D) combing algorithms typically operate on video samples that are temporally separated by a video frame, for example, the bottom frame, the current frame, and the top frame in FIG. 1C. These temporally separated video samples or video frames must be exactly aligned in order to prevent the formation of artifacts in the displayed picture due to misalignment. Alignment of the temporally separated video frames is generally achieved by delaying the frames. The amount of the delay required to align these frames generally varies depending on the video processing standard and/or processing scheme employed. For example, the amount of delay system required for NTSC and PAL standards and for progressive scan input video may vary between the standards. Furthermore, although some signals may conform in some respects to a particular standard, these signals may vary outside the specified ranges permitted by the particular standard. These signals that vary outside the specified ranges permitted by the standard may be referred to as non-standard signals. For example, a non-standard signal, which may be part of a data stream, may have frame lengths that vary outside the ranges permitted by a specific standard or these signals in the data stream may violate the relationship between a specified line length and the subcarrier frequency.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for 3D comb synchronization and alignment of standard and non-standard video signals. Aspects of the method comprise coarsely synchronizing and finely aligning a bottom frame, a current frame, and a top frame for video combing. A plurality of bottom frames may be stored prior to coarse synchronization. The stored bottom frames may be standard video frames, non-standard video frames, or compressed video frames. Each field in the bottom frames may be labeled with a bottom frame field count value when a bottom frame vertical sync signal is asserted and with an indication of the location of the bottom frame vertical sync signal. The bottom frame field count may be a modulo N count that is incremented with each assertion of the bottom frame vertical sync signal. The modulo number N may be larger than the total number of fields that may be assigned to the current frame and to the top frame.

The current frame may be assigned a first frame transferred immediately prior to a bottom frame or a first field and a second field transferred immediately prior to the bottom frame. The current frame and the bottom frame may be locked, or coarsely synchronized, when the bottom frame vertical sync signal occurs within a current frame window signal. The top frame may be assigned a frame transferred two frames prior to the bottom frame or a third field and a fourth field transferred prior to the bottom frame. The top frame and the bottom frame may be locked, or coarsely synchronized, when the bottom frame vertical sync signal occurs within a top frame window signal. Coarse synchronization may result in at least two frames being synchronized to within one subcarrier period. The bottom frame starting field may be utilized as a reference to determine the video fields that may be assigned to the current frame, the top frame, and the bottom frame.

Fine alignment between the current frame and the bottom frame may comprise correlating a phase difference between a subcarrier signal in the coarsely synchronized current frame and a subcarrier signal in the bottom frame and modifying the phase difference between the frames until the correlation results in a specified phase lock value range. Similarly, fine alignment between the current frame and the top frame may comprise correlating a phase difference between a subcarrier signal in the coarsely synchronized current frame and a subcarrier signal in the coarsely synchronized top frame and modifying the phase difference between the frames until the correlation results in a specified phase lock value range. The specified phase lock value range may correspond to the level of alignment accuracy that may be achieved. The fine frame alignment may result in the addition or removal of an integer sample delay when an integer sample delay slip occurs.

Aspects of system for synchronization and alignment of standard and non-standard video signals comprise a coarse frame synchronizer that coarsely synchronizes and a fine frame aligner that finely aligns a bottom frame, a current frame, and a top frame for video combing. A plurality of bottom frames may be stored into a memory prior to coarse synchronization. The bottom frames stored may be standard video frames, non-standard video frames, or compressed video frames. A processor may label each field in the bottom frames with a bottom frame field count value when a bottom frame vertical sync signal is asserted and with an indication of the location of the bottom frame vertical sync signal. The bottom frame field count may be a modulo N count that is incremented with each assertion of the bottom frame vertical sync signal. The modulo N number may be larger than the total number of fields that may be assigned to the current frame and to the top frame.

The processor may assign to the current frame a frame transferred immediately prior to a bottom frame or a first field and a second field transferred immediately prior to the bottom frame. The coarse frame synchronizer may generate a current frame window signal and a top frame window signal. The current frame and the bottom frame may be locked by the coarse frame synchronizer when the bottom frame vertical sync signal occurs within the current frame window signal. The processor may assign to the top frame, a frame transferred two frames prior to the bottom frame or a third field and a fourth field transferred prior to the bottom frame. The top frame and the bottom frame may be locked by the coarse frame synchronizer when the bottom frame vertical sync signal occurs within the top frame window signal. The coarse frame synchronizer may synchronize at least two frames being synchronized to within two integer sample delays. The bottom frame starting field may be utilized as a reference to determine the video fields that may be assigned to the current frame, the top frame, and the bottom frame.

A fine frame aligner may correlate a phase difference between a subcarrier signal in the coarsely synchronized current frame and a subcarrier signal in the bottom frame and may modify the phase difference between the frames until the correlation results in a specified phase lock value range. Similarly, the fine frame aligner may correlate a phase difference between a subcarrier signal in the coarsely synchronized current frame and a subcarrier signal in the coarsely synchronized top frame and may modify the phase difference between the frames until the correlation results in a specified phase lock value range. The specified phase lock value range may correspond the level of alignment accuracy that may be achieved and may be specified by the processor. The fine frame aligner may add or remove an integer sample delay when an integer sample delay slip occurs.

These and other advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for 3D comb synchronization and alignment of standard and non-standard video signals. Aspects of the invention may facilitate the handling of video stream switching and non-standard data streams. Video stream switching may occur, for example, when a television channel is changed, thereby causing the video stream to also change. The handling of video stream switching and the handling of the non-standard data streams may be accomplished in an organized manner by, for example, appropriately labeling and storing the video stream, followed by a coarse synchronization and then by a fine alignment of the stored video fields and/or video frames.

Figure 1A:
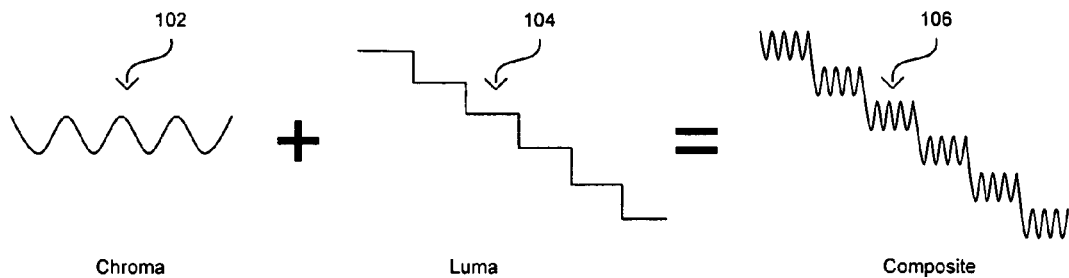
FIG. 1A is a diagram illustrating the generation of a conventional composite video signal.
Figure 1B:
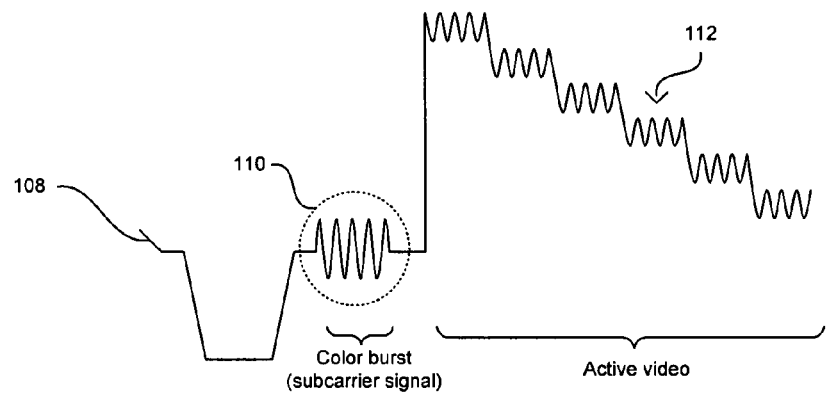
FIG. 1B is a diagram illustrating the position of color burst and active video in a conventional composite video signal.
Figure 1C:
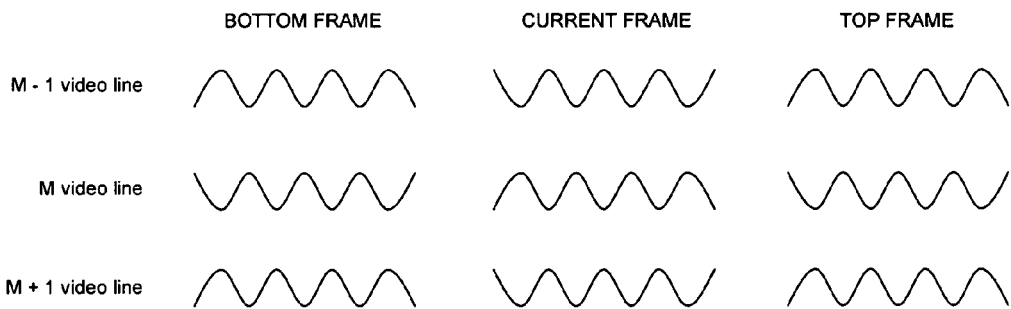
FIG. 1C is a graphical diagram illustrating the phase relationship of modulated chroma signals in contiguous composite video signal frames.
Figure 2:
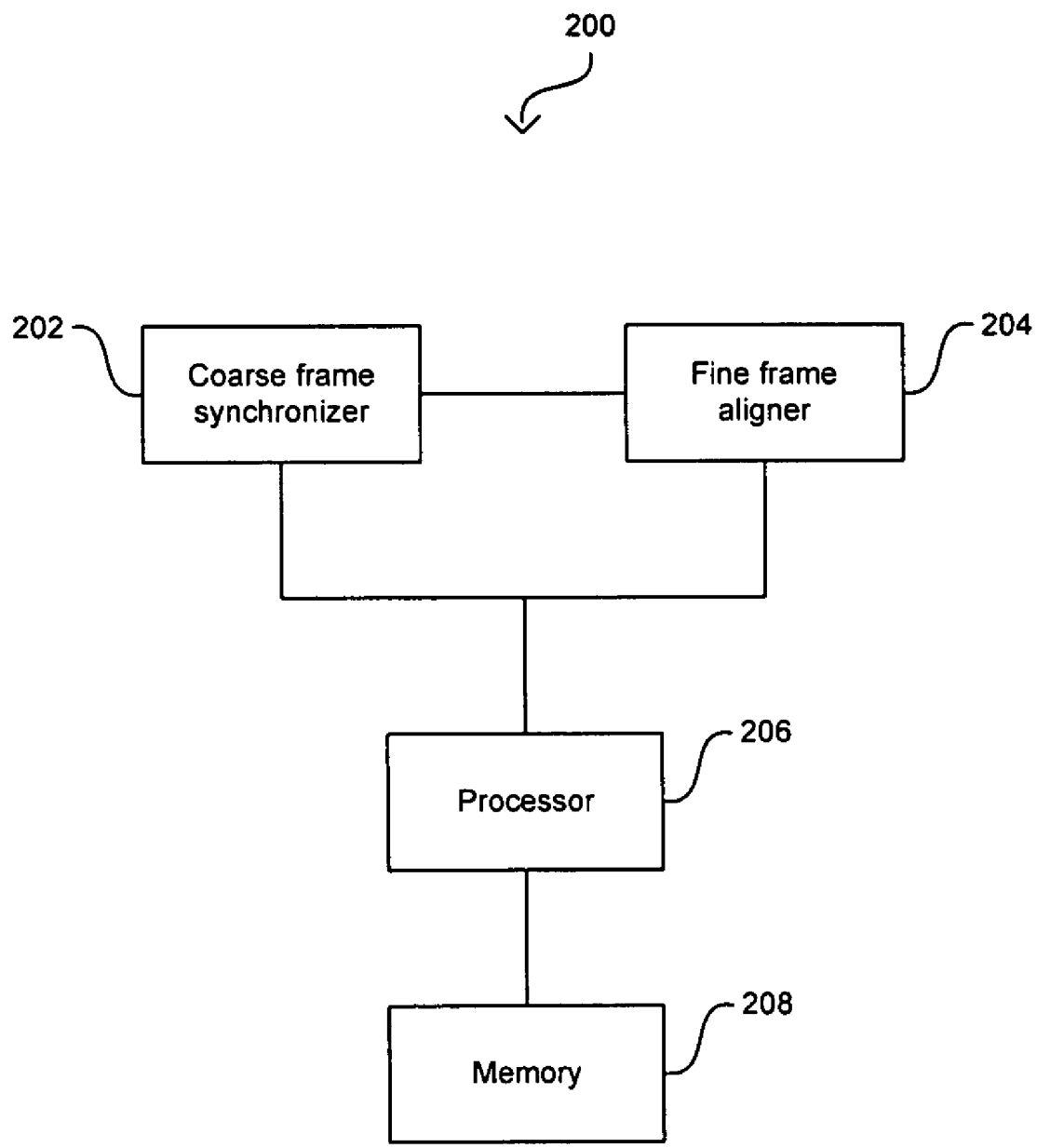
FIG. 2 is a block diagram illustrating an exemplary system which may be utilized for 3D comb synchronization and alignment of standard and non-standard video signals, in accordance with an embodiment of the invention.

FIG. 2 is a block diagram illustrating an exemplary system which may be utilized for 3D comb synchronization and alignment of standard and non-standard video signals, in accordance with an embodiment of the invention. Referring to FIG. 2, the synchronization and alignment system 200 may comprise a coarse frame synchronizer 202, a fine frame aligner 204, a processor 206, and a memory 208. The coarse frame synchronizer may comprise suitable logic, code, and/or circuitry and may be adapted to coarsely synchronize a current frame with a bottom frame and/or a top frame with the bottom frame to within one subcarrier period. The fine frame aligner 204 may comprise suitable logic, code, and/or circuitry and may be adapted to finely align the top frame with the current frame and/or the bottom frame with the current frame to within a specified phase lock value range. The processor 206 may comprise suitable logic, code, and/or circuitry and may be adapted to control the operation of the coarse frame synchronizer 202 and the fine frame aligner 204, and to transfer control information and/or data between the memory 208 and the coarse frame synchronizer 202 and the fine frame aligner 204. The memory 208 may comprise suitable logic, code, and/or circuitry and may be adapted to store control information and/or data for use by the synchronization and alignment system 200.

Figure 3:
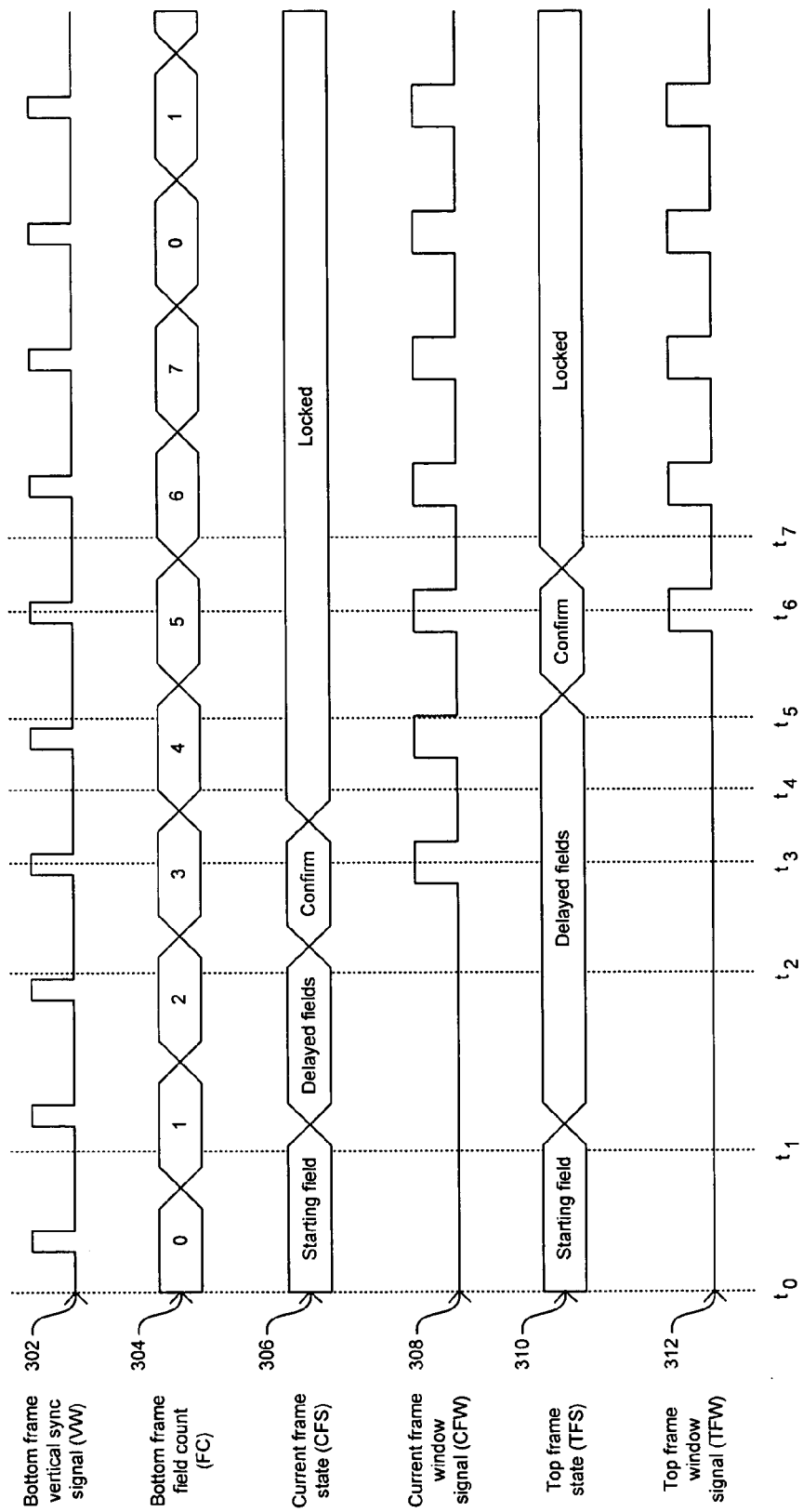
FIG. 3 is an exemplary timing diagram illustrating coarse synchronization between the bottom frame, the current frame, and the top frame for interlaced video signals, in accordance with an embodiment of the invention.

FIG. 3 is an exemplary timing diagram illustrating an exemplary coarse synchronization between the bottom frame, the current frame, and the top frame for interlaced video signals, in accordance with an embodiment of the invention.

Referring to FIG. 3, timing signals that may be utilized by the coarse frame synchronizer 202 for coarse synchronization in interlaced video signals may comprise a bottom frame vertical sync (VW) signal 302, a bottom frame field count (FC) signal 304, a current frame state (CFS) signal 306, a current frame window (CFW) signal 308, a top frame state (TFS) signal 310, and a top frame window (TFW) signal 312. The VW signal 302 may correspond to the clock assertion of a vertical sync signal which indicates the presence of a video field in a bottom frame video stream from the memory 208. The FC signal 304 may correspond to the count value in a modulo N counter indicating the order of arrival of a new video field in the bottom frame video stream. The CFS signal 406 may correspond to the status of the current frame relative to a bottom frame starting field. The CFW signal 308 may correspond to a time interval during which confirmation of coarse synchronization between the current frame and the bottom frame may be determined. The TFS signal 310 may correspond to the status of the top frame relative to the bottom frame starting field. The TFW signal 312 may correspond to a time interval during which confirmation of coarse synchronization between the top frame and the bottom frame may be determined.

At time $t_0$ in the timing diagram, the bottom frame, the current frame, and the top frame are not locked or coarsely synchronized. The time in FIG. 3 increases from left to right. When the VW signal 302, also known as V-Write signal, is asserted, the FC signal 304 is incremented to indicate the presence of a new bottom frame video field. The FC signal 304 is incremented after every new video field in the bottom frame video stream until it reaches its maximum value, as determined by the modulo N count, at which point the next FC signal 304 value is 0. The number N may be based on the ability to track the number of video field delays that exist between the top frame and the bottom frame. The bottom frame starting field may be, for example, the video field in the bottom frame video stream in FIG. 3 that corresponds to an FC signal 304 of value 0. The bottom frame starting field may be used as a reference to determine the video fields that may correspond to the top frame, the current frame, and the bottom frame. For example, when the bottom frame starting field in FIG. 3 corresponds to the FC signal 304 value of 0, then it may be delayed by two fields from the bottom frame video field that corresponds to an FC signal 304 value of 2 and by four fields from the bottom frame video field that corresponds to an FC signal 304 value of 4. When the bottom frame comprises the bottom frame video fields that corresponds to FC signal 304 values 5 and 4, then the current field may comprise the bottom frame video fields that correspond to FC signal 304 values 3 and 2 and the top frame may comprise the bottom frame video fields that correspond to FC signal 304 values 1 and 0. Similarly, when the bottom frame comprises the bottom frame video fields that corresponds to FC signal 304 values 6 and 5, then the current field may comprise the bottom frame video fields that correspond to FC signal 304 values 4 and 3 and the top frame may comprise the bottom frame video fields that correspond to FC signal 304 values 2 and 1. The bottom frame may comprise the most recent video fields received from the bottom frame video stream by the coarse frame synchronizer 202.

The CFS signal 306 may be utilized to indicate whether the coarse frame synchronizer 202 has read the bottom frame starting field from the memory 208. The CFS signal 306 may also be utilized to indicate that, after the bottom frame starting field has been read at time $t_1$, the coarse frame synchronizer 202 is reading additional video fields from the memory 208. The CFS signal 306 may be utilized to confirm, at time $t_3$, that the video fields necessary to assemble the current frame have been read from the memory 208 and that they are now locked, at time $t_4$, to the VW signal 302. The CFW signal 308 may be generated by the coarse frame synchronizer 202 during confirmation of the current frame in the CFS signal 306 and may be used by the CFS signal 306 to determine whether the current frame is coarsely synchronized.

The TFS signal 310 may be used to indicate whether the coarse frame synchronizer 202 has read the bottom frame starting field from the memory 208. The TFS signal 310 may also indicate that, after the bottom frame starting field has been read at time $t_1$, the coarse frame synchronizer 202 is reading additional video fields from the memory 208 and that those additional video fields may be delayed by the appropriate amount, for example, at time $t_5$. The TFS signal 310 may confirm, at time $t_6$, that the video fields necessary to assemble the top frame have been read from the memory 208 and that they are now locked, at time $t_7$, to the VW signal 302. The TFW signal 312 may be generated by the coarse frame synchronizer 202 during confirmation of the top frame in the TFS signal 310 and may be used by the TFS signal 310 to determine whether the top frame is coarsely synchronized.

The timing signals that may be utilized by the coarse frame synchronizer 202 for coarse synchronization in interlaced video signals may also be used for progressive video signals when the progressive video signals have an odd number of lines.

Figure 4:
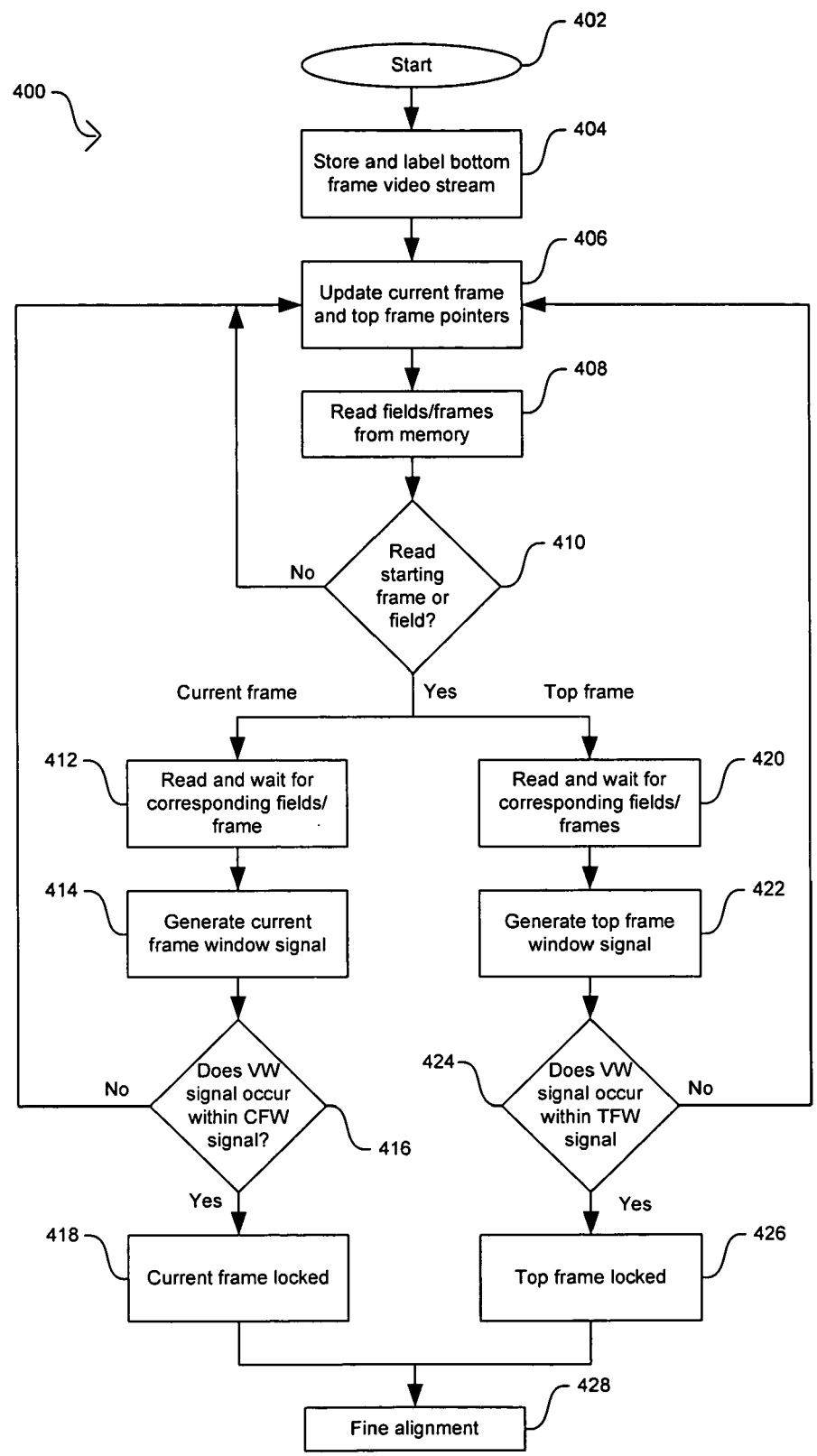
FIG. 4 is a flow diagram illustrating exemplary steps which may be utilized for coarse synchronization between the bottom frame, the current frame, and the top frame, in accordance with an embodiment of the invention.

FIG. 4 is a flow diagram illustrating exemplary steps which may be utilized for coarse synchronization between the bottom frame, the current frame, and the top frame, in accordance with an embodiment of the invention. Referring to FIG. 4, after start step 402, in step 404 the synchronization and alignment system 200 stores and labels the bottom frames in the bottom frame video stream continuously into the memory 208. The labeling may indicate the field count value and/or the location of the vertical sync signal. In an interlaced system the field count corresponds to a bottom frame field count while in a progressive system the field count corresponds to a bottom frame count. In step 406, after the assertion of the VW signal, the current frame and top frame read pointers may be adjusted to correspond to the bottom frame starting field or the bottom frame starting frame. In step 408, the coarse frame synchronizer 202 may read from the memory 208 the labeled bottom frame fields or bottom frames depending on whether the system is interlaced or progressive. In step 410, the coarse frame synchronizer 202 determines whether the fields or frames read correspond to the bottom frame starting field or a bottom frame starting frame for progressive systems. If the field or frame which has been read does not correspond to the bottom frame starting field or to the bottom frame starting frame, then the coarse frame synchronizer returns to step 406 and adjusts the current frame and top frame pointers. If the field or frame which has been read does correspond to the bottom frame starting field or to the bottom frame starting frame, then the coarse frame synchronizer may proceed to step 412 to coarsely synchronize the current frame with the bottom frame and/or to step 420 to coarsely synchronize the top frame with the bottom frame.

In step 412, after having read the bottom frame starting field or the bottom frame starting frame, the coarse frame synchronizer 202 waits for the appropriate number of fields or frames to be read. Once the appropriate fields or frame are delayed that may correspond to the current frame, the coarse frame synchronizer 202 may assign the fields or frame to the current frame. In step 414, after the current frame has been completed, the coarse frame synchronizer 202 may generate the current frame window (CFW) signal to confirm synchronization between the current frame and the bottom frame.

In step 416, the coarse frame synchronizer 202 may determine whether the current frame and the bottom frame are coarsely synchronized by comparing the VW signal and the CFW signal. If the VW signal occurs within the duration of the CFW signal, the current frame and the bottom frame are coarsely synchronized and the coarse frame synchronizer may proceed to step 418. If the VW signal does not occur within the duration of the CFW, then the current frame and the bottom frame are not coarsely synchronized and the coarse frame synchronizer 202 may return to step 406 and start the process again. In step 418, the coarse frame synchronizer 202 may indicate in the current frame state (CFS) signal that the current frame and the bottom frame are locked. Coarse synchronization may bring the current frame and bottom frame to within one subcarrier period. Once the frames are locked, the synchronization and alignment system 200 may proceed to step 428 where the bottom frame, the current frame, and the top frame may be finely aligned.

Returning to step 420, after having read the bottom frame starting field or the bottom frame starting frame, the coarse frame synchronizer 202 waits for the appropriate number of fields or frames to be read. Once the appropriate fields or frame are delayed that may correspond to the top frame, the coarse frame synchronizer 202 may assign the fields or frames to the top frame. In step 422, after the top frame has been completed, the coarse frame synchronizer 202 may generate the top frame window (TFW) signal to confirm synchronization between the top frame and the bottom frame.

In step 424, the coarse frame synchronizer 202 may determine whether the top frame and the bottom frame are coarsely synchronized by comparing the VW signal and the TFW signal. If the VW signal occurs within the duration of the TFW signal, the top frame and the bottom frame are coarsely synchronized and the coarse frame synchronizer may proceed to step 426. If the VW signal does not occur within the duration of the TFW, then the top frame and the bottom frame are not coarsely synchronized and the coarse frame synchronizer 202 may return to step 406 and start the process again. In step 426, the coarse frame synchronizer 202 may indicate in the top frame state (TFS) signal that the top frame and the bottom frame are locked. Coarse synchronization may bring the top frame and bottom frame to within one subcarrier period. Once the frames are locked, the synchronization and alignment system 200 may proceed to step 428 where the bottom frame, the current frame, and the top frame may be finely aligned.

Figure 5:
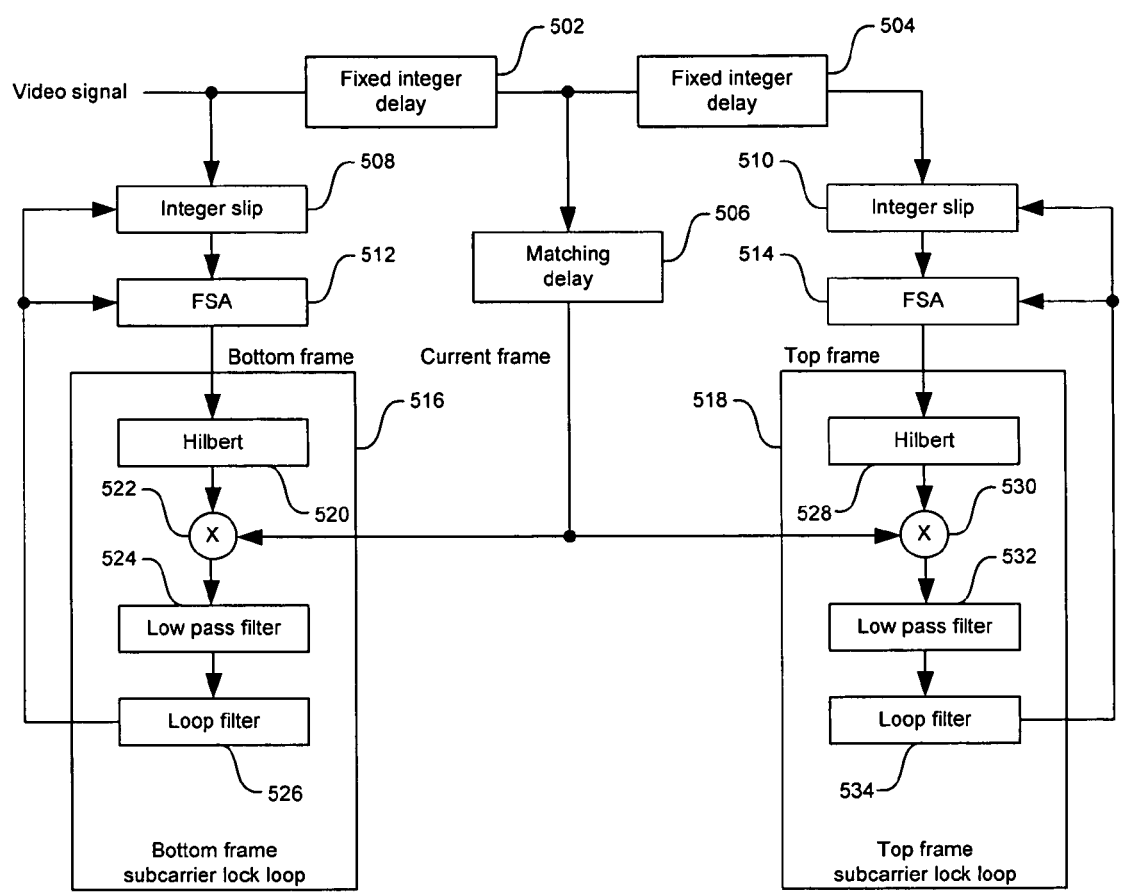
FIG. 5 is a block diagram of an exemplary fine frame synchronizer which may be utilized for fine synchronization between the bottom frame, the current frame, and the top frame, in accordance with an embodiment of the invention.

FIG. 5 is a block diagram of an exemplary fine frame synchronizer which may be utilized for fine synchronization between the bottom frame, the current frame, and the top frame, in accordance with an embodiment of the invention. Referring to FIG. 5, the fine frame aligner 204 may comprise a fixed integer delay 502, 504, a matching delay 506, an integer slip 508, 510, a FSA filter 512, 514, a bottom frame subcarrier lock loop 516, and a top frame subcarrier lock loop 518. The bottom frame subcarrier lock loop may comprise a filter 520, for example, a Hilbert filter, a correlator 522, a low pass filter 524, and a loop filter 526. The top frame subcarrier lock loop may comprise a filter 528, for example, a Hilbert filter, a correlator 530, a low pass filter 532, and a loop filter 534.

The fixed integer delay 502, 504 may comprise suitable logic, code, and/or circuitry and may be adapted to provide integer sample delays for the current frame and for the top frame in fixed clock architectures. For example, the sample delays may be based on an integer sample from a 27 MHz clock. The matching delay 506 may comprise suitable logic, code, and/or circuitry and may be adapted to adjust the delay for the current frame in fixed clock architectures. The integer slip 508, 510 may comprise suitable logic, code, and/or circuitry and may be adapted to add or remove an integer sample delay when the fractional delay crosses an integer boundary. The FSA filter 512, 514 may comprise suitable logic, code, and/or circuitry and may be adapted to determine the amount of fractional delay to apply to the bottom frame and for the top frame. The bottom frame subcarrier lock loop 516 may comprise suitable logic, code, and/or circuitry and may be adapted to lock the subcarrier signals in the current frame and the bottom frame. The top frame subcarrier lock loop 518 may comprise suitable logic, code, and/or circuitry and may be adapted to lock the subcarrier signals in the current frame and the top frame.

The Hilbert filter 520 in the bottom frame subcarrier lock loop 516 may comprise suitable logic, code, and/or circuitry and may be adapted to shift the subcarrier phase in the color burst of the signal coming from the FSA filter 512 by 90°. The correlator 522 may comprise suitable logic, code, and/or circuitry and may be adapted to correlate the color burst subcarrier of the signal coming from the Hilbert filter 520 and the color burst subcarrier of the current frame. The low pass filter 524 may comprise suitable logic, code, and/or circuitry and may be adapted to remove higher level harmonics that may result from the operation of the correlator 522. The loop filter 526 may comprise suitable logic, code, and/or circuitry and may be adapted to control the feedback rate in the bottom frame subcarrier lock loop 516.

The Hilbert filter 528 in the top frame subcarrier lock loop 518 may comprise suitable logic, code, and/or circuitry and may be adapted to shift the subcarrier phase in the color burst of the signal coming from the FSA filter 514 by 90°. The correlator 530 may comprise suitable logic, code, and/or circuitry and may be adapted to correlate the color burst subcarrier of the signal coming from the Hilbert filter 528 and the color burst subcarrier of the current frame. The low pass filter 532 may comprise suitable logic, code, and/or circuitry and may be adapted to remove higher level harmonics that may result from the operation of the correlator 530. The loop filter 534 may comprise suitable logic, code, and/or circuitry and may be adapted to control the feedback rate in the top frame subcarrier lock loop 518.

Figure 6:
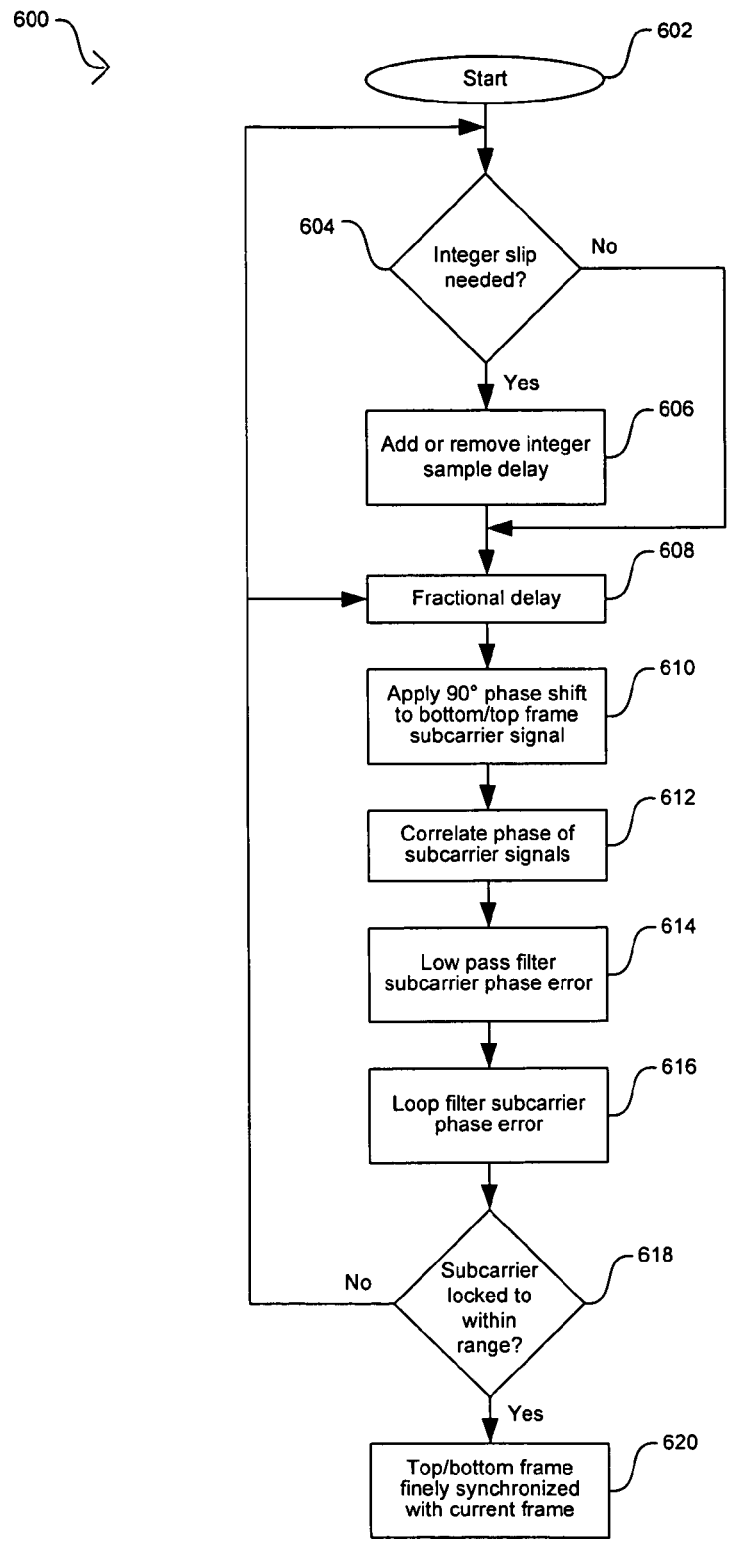
FIG. 6 is a flow diagram illustrating exemplary steps which may be utilized for fine synchronization between the current frame, the bottom frame, and the top frame, in accordance with an embodiment of the invention.

FIG. 6 is a flow diagram illustrating exemplary steps which may be utilized for fine synchronization between the current frame, the bottom frame, and the top frame, in accordance with an embodiment of the invention. Referring to FIG. 6, after start step 602, the integer slip 508, 510 may determine, in step 604, whether the coarsely synchronized bottom frame and/or the coarsely synchronized top frame may require the addition or removal of an integer sample delay. If an integer sample delay may not need to be added or removed, the bottom frame and/or the top frame in the fine frame aligner 204 may proceed to step 608. In step 608, the FSA filter 512, 514 may adjust a fractional delay to the bottom frame and/or the top frame respectively if the feedback from the bottom frame subcarrier lock loop 516 and the top frame subcarrier lock loop 518 provides for the adjustment.

In step 610, the Hilbert filter 520, 528 may apply a 90° phase shift to the color burst subcarrier in the bottom frame and/or the top frame. In step 612, the correlator 522, 530 may correlate the color burst subcarrier of the bottom frame and top frame respectively with the color burst subcarrier of the current frame. The correlation in step 612 may correspond to an error signal between the color burst subcarrier phase of the current frame and the color burst subcarrier phase of the bottom frame and/or the top frame. In step 614, the subcarrier phase error produced by the correlator 522, 530 may be low pass filtered to remove any higher order harmonics. In step 616, the low pass filtered subcarrier phase error from step 614 may be applied to the loop filter 526, 534 to determine feedback rate at which the subcarrier phase error may be applied to the integer slip 508, 510 and/or the FSA filter 512, 514. In step 618, the loop filter 526, 534 may determine whether the subcarrier phase error is within a specified phase lock value range. The specified phase lock value range may be programmed by the processor 206 and may be determined based on systems requirements. If the subcarrier phase error is not within the specified phase lock value range, then the fine frame aligner 204 may return to step 604 and provide the subcarrier phase error to the integer slip 508, 510 and/or it may return to step 608 and provide the subcarrier phase error to the FSA filter 512, 514 at the feedback rate determined in step 616. Whether the fine frame aligner 204 returns to step 604 or to step 608 may depend on the need for an integer slip in the feedback loop.

Returning to step 604, when the feedback provided by the bottom frame subcarrier lock loop 516 and/or the top frame subcarrier lock loop 518 produces a fractional delay that crosses an integer boundary, that is, a delay that may be longer than an integer sample delay and that may require an integer slip, the fine frame aligner 204 may add or remove an integer sample delay in step 606 before proceeding to step 608. In this case, the fractional delay applied in step 608 may be adjusted to reflect the integer slip that may have taken place in step 606.

Returning to step 618, if the subcarrier phase error is within the specified phase lock value range, then the fine frame aligner may proceed to step 620 where the bottom frame and/or the top frame may be considered to be finely aligned with the current frame.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for video signal processing, the method comprising:

coarsely synchronizing a current frame with at least one of a plurality of bottom frames based on a bottom frame field count, at least one current frame window signal, and at least one bottom frame vertical sync;

coarsely synchronizing a top frame with said at least one of a plurality of bottom frames based on said bottom frame field count, at least one top frame window signal, and said at least one bottom frame vertical sync; and finely aligning said coarsely synchronized current frame with at least one of said at least one of a plurality of bottom frames and said coarsely synchronized top frame.

2. The method according to claim 1, further comprising storing the value of said bottom frame field count and an indication of the location of said at least one bottom frame vertical sync for each of said at least one of a plurality of bottom frames.

3. The method according to claim 1, further comprising coarsely synchronizing at least two frames to within one subcarrier period.

4. The method according to claim 1, further comprising assigning a new value to said bottom frame field count based on the assertion of said at least one bottom frame vertical sync.

5. The method according to claim 1, further comprising assigning to said current frame, a frame transferred immediately prior to said at least one of a plurality of bottom frames, or a first field and a second field transferred prior to said at least one of a plurality of bottom frames.

6. The method according to claim 1, further comprising assigning to said top frame, a frame transferred two frames prior to said at least one of a plurality of bottom frames, or a third field and a fourth field transferred prior to said at least one of a plurality of bottom frames.

7. The method according to claim 1, further comprising generating said at least one current frame window signal, said at least one top frame window signal, and said at least one bottom frame vertical sync.

8. The method according to claim 1, further comprising locking said current frame with said at least one of a plurality of bottom frames when said at least one bottom frame sync occurs during said at least one current frame window signal.

9. The method according to claim 1, further comprising locking said top frame with said at least one of a plurality of bottom frames when said at least one bottom frame sync occurs during said at least one top frame window signal.

10. The method according to claim 1, further comprising correlating a phase difference between a subcarrier signal in said coarsely synchronized current frame and a subcarrier signal in said at least one of a plurality of bottom frames, and modifying said phase difference until said correlation results in a specified phase lock value range.

11. The method according to claim 1, further comprising correlating a phase difference between a subcarrier signal in said coarsely synchronized current frame and a subcarrier signal in said coarsely synchronized top frame, and modifying said phase difference until said correlation results in a specified phase lock value range.

12. The method according to claim 1, further comprising adding or removing an integer sample delay when an integer sample delay slip occurs.

13. A method for video signal processing, the method comprising:
    coarsely synchronizing a current frame with at least one of a plurality of compressed bottom frames;
    coarsely synchronizing a top frame with said at least one of a plurality of compressed bottom frames; and
    aligning said coarsely synchronized current frame with said at least one of a plurality of compressed bottom frames and said coarsely synchronized top frame.

14. The method according to claim 13, further comprising assigning to said current frame, a frame transferred immediately prior to said at least one of a plurality of compressed bottom frames, or a first field and a second field transferred prior to said at least one of a plurality of compressed bottom frames.

15. The method according to claim 13, further comprising correlating a phase difference between a subcarrier signal in said coarsely synchronized current frame and a subcarrier signal in said coarsely synchronized top frame and modifying said phase difference until said correlation results in a specified phase lock value range.

16. The method according to claim 13, further comprising correlating a phase difference between a subcarrier signal in said coarsely synchronized current frame and a subcarrier signal in said at least one of a plurality of compressed bottom frames, and modifying said phase difference until said correlation results in a specified phase lock value range.

17. A system for video signal processing, the system comprising:
    a coarse frame synchronizer that coarsely synchronizes a current frame with at least one of a plurality of bottom frames based on a bottom frame field count, at least one current frame window signal, and at least one bottom frame vertical sync;
    said coarse frame synchronizer coarsely synchronizes a top frame with at least one of a plurality of bottom frames based on said bottom frame field count, at least one top frame window signal, and said at least one bottom frame vertical sync; and
    a fine frame aligner that finely synchronizes said coarsely synchronized current frame with at least one of said at least one of a plurality of bottom frames and said coarsely synchronized top frame.

18. The system according to claim 17, wherein a processor stores in a memory, the value of said bottom frame field count and an indication of the location of said at least one bottom frame vertical sync for each of said at least one of a plurality of bottom frames.

19. The system according to claim 17, wherein said coarse frame synchronizer coarsely synchronizes at least two frames to within one subcarrier period.

20. The system according to claim 17, wherein a processor assigns a new value to said bottom frame field count based on the assertion of said at least one bottom frame vertical sync.

21. The system according to claim 17, wherein a processor assigns to said current frame, a frame transferred immediately prior to said at least one of a plurality of bottom frames, or a first field and a second field transferred prior to said at least one of a plurality of bottom frames.

22. The system according to claim 17, wherein a processor assigns to said top frame, a frame transferred two frames prior to said at least one of a plurality of bottom frames, or a third field and a fourth field transferred prior to said at least one of a plurality of bottom frames.

23. The system according to claim 17, wherein said coarse frame synchronizer generates said at least one current frame window signal and said at least one top frame window signal.

24. The system according to claim 17, wherein said coarse frame synchronizer locks said current frame with said at least one of a plurality of bottom frames when said at least one bottom frame sync occurs during said at least one current frame window signal.

25. The system according to claim 17, wherein said coarse frame synchronizer locks said top frame with said at least one of a plurality of bottom frames when said at least one bottom frame sync occurs during said at least one top frame window signal.

26. The system according to claim 17, wherein said fine frame aligner correlates a phase difference between a subcarrier signal in said coarsely synchronized current frame and a subcarrier signal in said at least one of a plurality of bottom frames and modifies said phase difference until said correlation results in a specified phase lock value range.

27. The system according to claim 17, wherein said fine frame aligner correlates a phase difference between a subcarrier signal in said coarsely synchronized current frame and a subcarrier signal in said coarsely synchronized top frame and modifies said phase difference until said correlation results in a specified phase lock value range.

28. The system according to claim 17, wherein said fine frame aligner adds or removes an integer sample delay an integer sample delay when an integer sample delay slip occurs.

29. A system for video signal processing, the system comprising:
    a coarse frame synchronizer that coarsely synchronizes a current frame with at least one of a plurality of compressed bottom frames;
    said coarse frame synchronizer coarsely synchronizes a top frame with said at least one of a plurality of compressed bottom frames; and
    a fine frame aligner finely synchronizes said coarsely synchronized current frame with said at least one of a plurality of compressed bottom frames and said coarsely synchronized top frame.

30. The system according to claim 29, wherein a processor assigns to said current frame, a frame transferred immediately prior to said at least one of a plurality of bottom frames, or a first field and a second field transferred prior to said at least one of a plurality of bottom frames.

31. The method according to claim 29, wherein said fine frame aligner correlates a phase difference between a subcarrier signal in said coarsely synchronized current frame and a subcarrier signal in said coarsely synchronized top frame and modifies said phase difference until said correlation results in a specified phase lock value range.

32. The method according to claim 29, wherein said fine frame aligner correlates a phase difference between a subcarrier signal in said coarsely synchronized current frame and a subcarrier signal in said at least one of a plurality of compressed bottom frames and modifies said phase difference until said correlation results in a specified phase lock value range.

33. A method for video signal processing, the method comprising:
    coarsely synchronizing a current frame with at least one of a plurality of compressed bottom frames;
    coarsely synchronizing a top frame with said at least one of a plurality of compressed bottom frames;
    aligning said coarsely synchronized current frame with said at least one of a plurality of compressed bottom frames and said coarsely synchronized top frame; and
    assigning to said top frame, a frame transferred two frames prior to said at least one of a plurality of compressed bottom frames, or a third field and a fourth field transferred prior to said at least one of a plurality of bottom frames.

34. A method for video signal processing, the method comprising:
coarsely synchronizing a current frame with at least one of a plurality of compressed bottom frames;
coarsely synchronizing a top frame with said at least one of a plurality of compressed bottom frames;
aligning said coarsely synchronized current frame with said at least one of a plurality of compressed bottom frames and said coarsely synchronized top frame; and
coarsely synchronizing said current frame with said at least one of a plurality of compressed bottom frames based on a bottom frame field count, at least one current frame window signal, and at least one bottom frame vertical sync.

35. A method for video signal processing, the method comprising:
coarsely synchronizing a current frame with at least one of a plurality of compressed bottom frames;
coarsely synchronizing a top frame with said at least one of a plurality of compressed bottom frames;
aligning said coarsely synchronized current frame with said at least one of a plurality of compressed bottom frames and said coarsely synchronized top frame; and
coarsely synchronizing said top frame with said at least one of a plurality of compressed bottom frames based on a bottom frame field count, at least one top frame window signal, and at least one bottom frame vertical sync.

36. A system for video signal processing, the system comprising:
a coarse frame synchronizer that coarsely synchronizes a current frame with at least one of a plurality of compressed bottom frames;
said coarse frame synchronizer coarsely synchronizes a top frame with said at least one of a plurality of compressed bottom frames;
a fine frame aligner that finely synchronizes said coarsely synchronized current frame with said at least one of a plurality of compressed bottom frames and said coarsely synchronized top frame; and
a processor that assigns to said top frame, a frame transferred two frames prior to said at least one of a plurality of bottom frames, or a third field and a fourth field transferred prior to said at least one of a plurality of bottom frames.

37. A system for video signal processing, the system comprising:
a coarse frame synchronizer that coarsely synchronizes a current frame with at least one of a plurality of compressed bottom frames based on a bottom frame field count, at least one current frame window signal, and at least one bottom frame vertical sync;
said coarse frame synchronizer coarsely synchronizes a top frame with said at least one of a plurality of compressed bottom frames; and
a fine frame aligner that finely synchronizes said coarsely synchronized current frame with said at least one of a plurality of compressed bottom frames and said coarsely synchronized top frame.

38. A system for video signal processing, the system comprising:
a coarse frame synchronizer that coarsely synchronizes a current frame with at least one of a plurality of compressed bottom frames;
said coarse frame synchronizer coarsely synchronizes a top frame with said at least one of a plurality of compressed bottom frames based on a bottom frame field count, at least one top frame window signal, and at least one bottom frame vertical sync; and
a fine frame aligner finely synchronizes said coarsely synchronized current frame with said at least one of a plurality of compressed bottom frames and said coarsely synchronized top frame.

* * * * *